United States Patent
Kleo

(10) Patent No.: US 7,630,378 B2
(45) Date of Patent: Dec. 8, 2009

(54) METHOD FOR IMPROVING THE QOS MECHANISMS IN THE BANDWIDTH ALLOCATION-IN CDMA MOBILE COMMUNICATION SYSTEMS

(75) Inventor: Rémi Kleo, Bornheim (DE)

(73) Assignee: T-Mobile Deutschland GmbH, Bonn (DE)

( * ) Notice: Subject to any disclaimer, the term of this patent is extended or adjusted under 35 U.S.C. 154(b) by 353 days.

(21) Appl. No.: 10/532,861

(22) PCT Filed: Oct. 27, 2003

(86) PCT No.: PCT/DE03/03570

§ 371 (c)(1),
(2), (4) Date: Nov. 7, 2005

(87) PCT Pub. No.: WO2004/040932

PCT Pub. Date: May 13, 2004

(65) Prior Publication Data

US 2006/0159105 A1    Jul. 20, 2006

(30) Foreign Application Priority Data

Oct. 29, 2002   (DE) ................ 102 50 501

(51) Int. Cl.
*H04W 72/04* (2006.01)
*H04L 12/56* (2006.01)

(52) U.S. Cl. .......... 370/395.21; 370/352; 370/342

(58) Field of Classification Search ........ 370/342
See application file for complete search history.

(56) References Cited

U.S. PATENT DOCUMENTS

| 6,069,883 | A | 5/2000 | Ejzak et al. |
| 6,097,733 | A | 8/2000 | Basu et al. |
| 6,587,433 | B1 * | 7/2003 | Borella et al. ............. 370/230 |
| 6,889,050 | B1 * | 5/2005 | Willars et al. ............ 455/452.2 |
| 2002/0002041 | A1 * | 1/2002 | Lindgren et al. ............ 455/404 |
| 2002/0160777 | A1 * | 10/2002 | Takao et al. ................. 455/436 |
| 2003/0009580 | A1 * | 1/2003 | Chen et al. .................. 709/231 |
| 2003/0012133 | A1 * | 1/2003 | Jappinen ..................... 370/225 |
| 2003/0172160 | A9 * | 9/2003 | Widegren et al. ........... 709/226 |
| 2004/0203450 | A1 * | 10/2004 | Cho ........................ 455/67.11 |
| 2005/0159166 | A1 * | 7/2005 | Jonsson et al. ........... 455/452.2 |
| 2006/0140115 | A1 * | 6/2006 | Timus et al. ................ 370/230 |

FOREIGN PATENT DOCUMENTS

| EP | 1 154 663 A | 11/2001 |
| WO | WO 00/27157 A1 | 5/2000 |
| WO | WO 01/31832 A1 | 5/2001 |
| WO | WO 02/43429 A1 | 5/2002 |

OTHER PUBLICATIONS

Koodli, R., et al "Supporting Packet-Data QoS in Next-Generation Cellular Networks" IEEE Communications Magazine, S. (Feb. 2001) pp. 180-188.

Kaaranen, H et al "UMTS Networks—Architecture, Mobility, Services" John Wiley & Sons, Ltd. (20001) pp. 141-149.

3G TR 25.946 V2.0.0 (Mar. 2001) Technical Report, 3rd Generation Partnership Project; Technical Specification Group (TSG) RAN; RAB Quality of Service Negotiation over lu (Release 4) pp. 1-19.

"Digital cellular telecommunications system (Phase 2+); Universal Mobile Telecommunications System (UMTS); End to end Quality of Service (QoS) concept and architecture" ETSI TS 123 207 V5.5.0 Release 5, (Sep. 2002) pp. 1-48.

* cited by examiner

*Primary Examiner*—Rafael Pérez-Gutiérrez
*Assistant Examiner*—German Viana Di Prisco
(74) *Attorney, Agent, or Firm*—Browdy and Neimark, PLLC

(57) ABSTRACT

The invention relates to a method for improving QoS mechanisms during bandwidth allocation in CDMA mobile communication systems, characterized in that the user terminal signals the minimal bandwidth (bit rate) which is required to the mobile communication system and a bandwith within said range is allocated to the radio interface when available. As a result, the opportunities provided by the user terminal and the bandwith available in the radio cell are used as efficiently as possible.

8 Claims, No Drawings

METHOD FOR IMPROVING THE QOS MECHANISMS IN THE BANDWIDTH ALLOCATION-IN CDMA MOBILE COMMUNICATION SYSTEMS

The invention relates to a method for improving the QoS (Quality of Service) mechanisms in the bandwidth allocation in CDMA mobile communication systems, such as e.g., a UMTS mobile communication system.

A UMTS network is composed of a plurality of radio network subsystems (RNS). Each RNS consists of a radio network controller (RNC) and one or a plurality of nodes B. A node B contains one or a plurality of radio stations, each of which cover one radio cell (sector). The RNC takes on the control for handover and the functions in connection with macrodiversity between different nodes B. The individual RNS themselves can exchange data among themselves directly via the corresponding RNC. The connection of the nodes B to their RNC takes place via a Uu interface.

A node B administers a group of radio cells, which may be operated in FDD mode, TDD mode, or in both duplex modes. It is capable of controlling soft handover and macrodiversity within its cells independently from the RNC. The purpose of the signaling procedure lies in the establishment of a Radio Access Bearer from the CN to the end unit. For this purpose the RAB ASSIGNMENT REQUEST message contains the established RAB-ID, as well as all necessary routing parameters and the desired quality of service (QoS). It is possible to negotiate a QoS; in this case the response RAB ASSIGNMENT RESPONSE contains the actual QoS allocated to this RAB. The message RAB ASSIGMENT REQUEST is always sent from the CN and can, in addition to establishing a RAB, also be used for its modification or release. With a single procedure, a plurality of RABs can be established to a subscriber end unit. A RAB thus represents a user data channel through the UMTS network to the subscriber end unit.

A UMTS TD-CMDA system comprises 64 speech channels per carrier. With these 64 channels, different data rates from 9.6 kbit/s to 2 Mbit/s can now be flexibly adjusted by combining the channels accordingly.

According to the method for activating a so-called Packet Data Protocol context (PDP context), as it can be found in the specification ETSI TS 123 207 V5.5.0 (2002-09), "Digital Cellular Telecommunications System (Phase 2+), Universal Mobile Telecommunications System (UMTS), End to End Quality of Service (QoS) Concept and Architecture", 3GPP TS 23.207, the subscriber end unit sends the message ACTIVATE PDP CONTEXT REQUEST, which contains the requested QoS parameters. The contained QoS information elements, however, up to now comprise only information regarding the guaranteed bit rate granted to the subscriber end unit and the maximum bit rate for uplink and downlink. It should be mentioned at this point that the terms bandwidth, bit rate and data rate within the framework of this invention are used in an equivalent manner.

U.S. Pat. No. 6,069,883A reveals a CDMA mobile radio system with the option of allocating an increased bandwidth to a mobile station requesting this bandwidth. The purpose here is not to guarantee a minimum bandwidth reported by the mobile station, but to make available to the mobile station the highest possible bandwidth.

EP 1 154 663 A1 reveals a method for controlling the Quality of Service (QoS) in a mobile communication network wherein a check is performed for each new connection regarding whether a desired bandwidth can be made available. In the process, a degradation in the bandwidth of existing connections is accepted within specified limits, if necessary. A so-called QoS descriptor is therefore specified for each connection, which determines by how much the bandwidth allocated to this connection may be reduced if required.

It is the object of the invention to create a method for improving the QoS mechanisms in the bandwidth allocation in CDMA mobile communication systems whereby the available bandwidth in a radio cell can be optimized.

This object is met according to the invention, which provides for a method for improving the QoS mechanisms in the bandwidth allocation in CDMA mobile communication systems, wherein the subscriber end unit signals to the mobile communication system which minimum bandwidth (bit rate) it requires, and the mobile communication system allocates to the connection to the subscriber end unit a bandwidth within the requested range, if available.

Advantageous embodiments and improvements of the invention will become apparent from the subclaims.

The invention enables a subscriber end unit to signal to the mobile communication network which minimum bit rate it requires for downlink and uplink. Based on the minimum bit rate specified by the end unit and the maximum bit rate established in the standard, the RNC can optimize the administration of the available bandwidth. The possibilities of the subscriber end unit and bandwidth available in the radio cell are thus utilized to the fullest extent possible.

The invention takes as a starting point that a total bandwidth is available in each radio cell. Each subscriber end unit that influences the radio cell is thus allocated, if possible, a desired or required effective bandwidth. It is now the mission of the resource administration to ensure that the sum of the effective bandwidths is always smaller than the total bandwidth in the radio cell.

In the QoS request, the subscriber end unit specifies the minimum bit rate that is needed by it and by the given application. If the specified minimum bit rate is not available on the air interface, the application cannot be carried out.

During the PDP context activation, the assigned network node sends the message RAB ASSIGNMENT REQUEST to the RNC, which, as known up to now, contains the maximum bit rate allocated to the subscriber end unit or air interface, and the guaranteed bit rate for uplink and downlink.

Additionally, this message according to the invention contains information regarding the minimum bit rate and maximum bit rate that are available to the subscriber end unit and to the given application. These minimum and maximum bit rates correspond to the requested bit rates, provided that the necessary bandwidth capacity is available in the radio cell.

The RNC handles the assignment of the RAB (Radio Access Bearer) and of the codes in accordance with the requested bandwidth.

In accordance with the invention, the RNC is responsible for the assignment of RAB and bandwidth according to a list of rules that can be established and modified by a network operator.

The rules are essentially based on the following input parameters:
  Class of Service
  Available bandwidth and/or codes
  The requested maximum bit rate
  The requested minimum bit rate
  The requested guaranteed bit rate Based on these rules a corresponding RAB is assigned to the air interface.

The rules may be time-dependent. The rules may permit, for example, to allocate higher bit rates to a subscriber end unit during the night, i.e., during a time of reduced traffic loads. The rules may also depend on the given subscriber relationship and/or applied fee schedule.

If sufficient bandwidth (or codes) are available in the radio cell, the allocated bit rate cannot be higher than the "maximum" bit rate, but higher than the "guaranteed" bit rate specified in the requested QoS, as long as it is between the minimum and maximum bit rate requested by the subscriber end unit.

The allocated QoS parameters are then sent back to the subscriber end unit by a network node (e.g., by a SGSN) by means of the message "ACTIVATE PDP CONTEXT ACCEPT".

The allocated bit rate can also be modified later by means of the "PDP-context modification procedure" defined in the 3GPP ($3^{rd}$ Generation Partnership Project [www.3GPP.org]), e.g., if the remaining available bandwidth is requested by other subscribers.

The invention will now be explained in more detail based on a simple example.

The following case exists: An air interface of a radio cell, at a point in time t0, has a total available bandwidth of 256 kbit/s.

At the time t0, a user 1 requests a RAB with a guaranteed and maximum bit rate of 64 kbit/s in order to download a file with a size of 256 kbit. Following the current rules, as they are defined, e.g., in 3GPP, the RNC assigns to the user a code that corresponds to a bit rate of 64 kbit/s. At the requested bit rate, the download is completed in 4 seconds, i.e., at the point in time t0+4s.

At the time t0+1s, user 2 and user 3 also request a RAB with a guaranteed bandwidth of 64 kbit/s. These requests can be met.

The remaining bandwidth on the air interface at the time t0+1s is, therefore, 64 kbit/s.

At the time t0+2s, a user 4 requests a RAB with a guaranteed and maximum bit rate of 128 kbit/s. This request can not be met since only a bandwidth of 64 kbit/s is currently available on the air interface.

If user 1, however, had signaled to the network at the point in time t0 that he is requesting a maximum bandwidth of 128 kbit/s for the download of a file of 256 kbit, the RNC would have allocated to the user a code for 128 kbit/s. Taking into account the bandwidths of 64 kbit/s allocated to each of the users 1 and 2, the download of user 1 would have been completed at the point in time t0+2, and a bandwidth of 128 kbit/s would have been available. User 4 could, therefore, have been allocated the desired bandwidth of 128 kbit/s.

What is claimed is:

1. A method for improving quality of service QoS mechanisms in bandwidth allocation in a CDMA mobile communication system, comprising:

during a PDP context activation, sending, from a subscriber end unit to a radio network controller in the mobile communication system a requested minimum bandwidth the subscriber end unit requires, comprising sending an RAB ASSIGNMENT REQUEST message including QoS parameters and information regarding a guaranteed bit rate, a minimum bit rate and a maximum bit rate that are available to the subscriber end unit, from an assigned network node to a network node radio network controller, wherein the minimum and maximum bit rates correspond to the signaled bandwidth, provided that sufficient bandwidth capacity is available;

allocating, by the radio network controller in the mobile communication system, to the connection with the subscriber end unit, a bandwidth within the signaled bandwidth, if available; and handling, via the radio network controller, an assignment of a Radio Access Bearer RAB and of codes according to the signaled bandwidth, wherein the assignment of the RAB and signaled bandwidth takes place according to a number of rules, wherein the guaranteed bit rate is greater than the minimum bit rate and smaller than the maximum bit rate.

2. A method according to claim 1, wherein the step of signaling the minimum bandwidth comprises requesting the minimum bandwidth within an ACTIVATE PDP CONTEXT REQUEST message.

3. A method according to claim 2, wherein allocated QoS parameters are sent back from a network node in the mobile communication system by means of an ACTIVATE PDP CONTEXT ACCEPT message to the subscriber end unit.

4. A method according to claim 1, wherein allocated QoS parameters are sent back from the network node by means of an ACTIVATE PDP CONTEXT ACCEPT message to the subscriber end unit.

5. A method according to claim 1, wherein the rules are based on at least one of the following input parameters: Class of Service, available bandwidth and/or codes, requested maximum bit rate and/or requested guaranteed bit rate.

6. A method according to claim 5, wherein the rules are time-dependent.

7. A method according to claim 5, wherein the rules depend on the given subscriber relationship and/or applied fee schedule.

8. A method according to claim 1, further comprising modifying the allocated bandwidth by means of a PDP-context modification procedure if a remaining available bandwidth is requested by other subscribers.

\* \* \* \* \*